United States Patent
Kuroko et al.

(10) Patent No.: US 8,966,244 B2
(45) Date of Patent: Feb. 24, 2015

(54) EMBEDDED APPARATUS, REMOTE-PROCESSING METHOD, AND COMPUTER PROGRAM PRODUCT

(75) Inventors: Takehito Kuroko, Kanagawa (JP); Manabu Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1371 days.

(21) Appl. No.: 12/495,938

(22) Filed: Jul. 1, 2009

(65) Prior Publication Data

US 2010/0011206 A1    Jan. 14, 2010

(30) Foreign Application Priority Data

Jul. 14, 2008 (JP) ................... 2008-182806
Jun. 4, 2009 (JP) ................... 2009-135091

(51) Int. Cl.
*H04L 29/06* (2006.01)
*H04L 29/08* (2006.01)

(52) U.S. Cl.
CPC ......... *H04L 63/0428* (2013.01); *H04L 63/0236* (2013.01); *H04L 67/06* (2013.01); *H04L 67/08* (2013.01)
USPC .......................... 713/153; 713/154

(58) Field of Classification Search
CPC ............... H04L 63/02; H04L 29/06
USPC .............. 726/11–15; 713/153–154
See application file for complete search history.

(56) References Cited

U.S. PATENT DOCUMENTS

| | | | |
|---|---|---|---|
| 7,457,839 B2 | 11/2008 | Nakamura et al. | |
| 2002/0035681 A1 * | 3/2002 | Maturana et al. | 713/151 |
| 2003/0065950 A1 * | 4/2003 | Yarborough | 713/201 |
| 2004/0243923 A1 | 12/2004 | Nakamura | |
| 2005/0097074 A1 | 5/2005 | Deno et al. | |
| 2005/0114469 A1 | 5/2005 | Nakamura et al. | |
| 2005/0180398 A1 | 8/2005 | Deno et al. | |
| 2005/0190769 A1 * | 9/2005 | Smith | 370/395.2 |
| 2005/0246447 A1 | 11/2005 | Smidt et al. | |
| 2006/0085649 A1 * | 4/2006 | Wong | 713/183 |

(Continued)

FOREIGN PATENT DOCUMENTS

| | | |
|---|---|---|
| JP | 2005-303376 | 10/2005 |
| JP | 2005-537699 | 12/2005 |
| JP | 2007-251568 | 9/2007 |

OTHER PUBLICATIONS

Huo et al., "The Design of a Data Transfer Module over Intranet in BIT System" Communications and Information Technology, 2005. ISCIT 2005. IEEE International Symposium on pp. 914-916.*

(Continued)

*Primary Examiner* — Bradley Holder
*Assistant Examiner* — Roderick Tolentino
(74) *Attorney, Agent, or Firm* — Cooper & Dunham LLP

(57) ABSTRACT

A processing unit performs a predetermined process by a remote operation from a client device. A monitoring unit monitors a first port for an unencrypted communication with the processing unit and a second port for an encrypted communication with the processing unit, denies a connection request via the first port, and accepts a connection request via the second port. When a connection request encrypted with either one of the first port and the second port specified as a forwarding destination port is received, an encrypted communication unit decrypts the connection request and transfers decrypted connection request to the monitoring unit via the forwarding destination port.

10 Claims, 16 Drawing Sheets

(56) References Cited

U.S. PATENT DOCUMENTS

| | | | |
|---|---|---|---|
| 2006/0132842 A1 | 6/2006 | Nakamura | |
| 2006/0236124 A1* | 10/2006 | Polozoff et al. | 713/189 |
| 2007/0024653 A1* | 2/2007 | Kim | 347/14 |
| 2007/0118760 A1* | 5/2007 | Masui | 713/189 |
| 2007/0234047 A1* | 10/2007 | Miyazawa | 713/158 |
| 2007/0250717 A1 | 10/2007 | Kumagai et al. | |
| 2008/0104687 A1* | 5/2008 | Fujiwara et al. | 726/10 |
| 2008/0229302 A1* | 9/2008 | Kufeldt et al. | 717/173 |
| 2008/0301305 A1* | 12/2008 | Huang | 709/228 |
| 2009/0006839 A1* | 1/2009 | Matsuoka et al. | 713/150 |
| 2009/0187648 A1* | 7/2009 | Sunkammurali et al. | 709/223 |

OTHER PUBLICATIONS

Trimintzios et al., "DiMAPI: An Application Programming Interface for Distributed Network Monitoring," Network Operations and Management Symposium, 2006. NOMS 2006. pp. 382-393.*

May 11, 2010 Japanese official action in connection with counterpart Japanese patent application.

Kunio Miyamoto (2007), "Let's make your environment secure and easy to use! 'iron-tight' remote control technique for network and server. 2. Introduction of OpenSSH for achieving a secure environment/Setting guide", Software Design No. 198, pp. 26-36.

* cited by examiner

EMBEDDED APPARATUS, REMOTE-PROCESSING METHOD, AND COMPUTER PROGRAM PRODUCT

CROSS-REFERENCE TO RELATED APPLICATIONS

The present application claims priority to and incorporates by reference the entire contents of Japanese Patent Application No. 2008-182806 filed in Japan on Jul. 14, 2008 and Japanese Patent Application No. 2009-135091 filed in Japan on Jun. 4, 2009.

BACKGROUND OF THE INVENTION

1. Field of the Invention

The present invention relates to an embedded apparatus connected to a client device, a remote-processing method, and a computer program product.

2. Description of the Related Art

In recent years, in an embedded apparatus such as a multifunction peripheral (MFP) that includes a printer function, a copier function, a facsimile function, a scanner function, and the like, various settings, reference or change of the settings, and the like are performed from a client device by a remote-communication service (hereinafter, "telnet service" (telecommunication network service)) using telnet protocol.

The various settings and the reference or change of the settings of the embedded apparatus are preferably performed by an encrypted communication not by an unencrypted communication in plain text to enhance security.

However, the telnet protocol that is used in the various settings and the like is a protocol for communication in plain text, so that the encrypted communication using a secure shell (SSH) program (hereinafter, "SSH service") is considered for improving security. In other words, it is considered to perform the various settings and the like for the embedded apparatus from the client device by the encrypted communication using the SSH service.

The telnet service in the embedded apparatus is different from the one used in UNiplexed Information and Computing System (UNIX) (registered trademark). Specifically, in the telnet service used in UNIX, a user logs into a server from the client device via a network for a remote operation. For example, the user can access a UNIX file system on the server from a shell or can execute commands provided in UNIX on the server from the shell.

On the other hand, the telnet service in the embedded apparatus cannot access a file system of the embedded apparatus or allow execution of commands provided in an operating system (OS) of the embedded apparatus, which is different from the one used in UNIX. In other words, the telnet service in the embedded apparatus only has a function as a computer program for performing the various settings and the like by the remote operation from the client device.

Moreover, the SSH service in the embedded apparatus also functions differently from the one in UNIX. Specifically, in the SSH service in UNIX, a user can log into a server by the encrypted communication using secure socket layer (SSL) protocol to start the shell and perform the remote operation from the shell similarly to the telnet service. On the other hand, the SSH service in the embedded apparatus does not have a function of the shell because access to a file system or execution of UNIX commands are not allowed as described above, so that the shell cannot be started.

Therefore, the following methods are considered to perform the various settings and the like of the embedded apparatus from the client device by the encrypted communication.

A first method is to embed a function equivalent to the telnet service, i.e., a telnet daemon, to the SSH service, i.e., an SSH daemon.

However, with this method, maintenance for both of the telnet daemon and the SSH daemon is required, thereby complicating maintenance and management of computer programs.

A second method is to establish a pipe connection between the SSH daemon and the telnet daemon by starting the telnet daemon directly by the SSH daemon. In a typical method in UNIX, the telnet daemon is started by an inet (Internet) daemon.

However, with this method, a new telnet daemon needs to be developed, and a process for identifying a port becomes complicated.

Therefore, a method of providing a function equivalent to the telnet service using a port forwarding function as a function of the SSH service is considered. Specifically, a technique is known to access the telnet service from an internal network using the port forwarding function, thus enabling to use the telnet service.

However, although the port forwarding function enables the encrypted communication via the SSH daemon to a port connectable by the unencrypted communication, it is not for avoiding the unencrypted communication. Therefore, the unencrypted communication can still be used. In other words, the telnet daemon needs to be always run to use the port forwarding function of the SSH, which means that not only a port for the encrypted communication but also a port for the unencrypted communication are always in an open state.

Therefore, when a user who is unfamiliar with a security performs the unencrypted communication, plaintext information may be read by a third party. For example, Japanese Patent Application Laid-open No. 2007-251568 discloses a technique as a countermeasure for the above problem, in which when a request for the unencrypted communication is received from the client device, a reply is sent to the client device to cause the client device to perform the encrypted communication.

However, in the above technique, the unencrypted communication can be avoided only by nullifying the function of the unencrypted communication, causing the SSH port forwarding function unusable.

SUMMARY OF THE INVENTION

It is an object of the present invention to at least partially solve the problems in the conventional technology.

According to one aspect of the present invention, there is provided an embedded apparatus that is configured to be connected to a client device via a network. The embedded apparatus includes a processing unit that performs a predetermined process by a remote operation from the client device; a monitoring unit that monitors a first port that is a connection interface for an unencrypted communication with the processing unit and a second port that is a connection interface for an encrypted communication with the processing unit, denies a connection request via the first port to the processing unit, and accepts a connection request via the second port to the processing unit; and an encrypted communication unit that performs an encrypted communication with the client device, when a connection request encrypted with either one of the first port and the second port specified as a forwarding destination port is received, decrypts the connection request, and transfers decrypted connection request to the monitoring unit via the forwarding destination port. When the connection request is accepted, the processing unit performs the predetermined process by an encrypted communication with the client device via the second port and the encrypted communication unit.

Furthermore, according to another aspect of the present invention, there is provided a remote-processing method for an embedded apparatus that is configured to be connected to a client device via a network. The embedded apparatus includes a processing unit, a monitoring unit, and an encrypted communication unit. The remote-processing method includes processing including the processing unit performing a predetermined process by a remote operation from the client device; monitoring including the monitoring unit monitoring a first port that is a connection interface for an unencrypted communication with the processing unit and a second port that is a connection interface for an encrypted communication with the processing unit, denies a connection request via the first port to the processing unit, and accepts a connection request via the second port to the processing unit; and communicating including the encrypted communication unit performing an encrypted communication with the client device, when a connection request encrypted with either one of the first port and the second port specified as a forwarding destination port is received, decrypting the connection request, and transferring decrypted connection request to the monitoring unit via the forwarding destination port. When the connection request is accepted, the processing includes the processing unit performing the predetermined process by an encrypted communication with the client device via the second port and the encrypted communication unit.

Moreover, according to still another aspect of the present invention, there is provided a computer program product including a computer-usable medium having computer-readable program codes embodied in the medium for implementing a remote-processing method for an embedded apparatus that is configured to be connected to a client device via a network. The embedded apparatus includes a processing unit, a monitoring unit, and an encrypted communication unit. The program codes when executed cause a computer to execute processing including the processing unit performing a predetermined process by a remote operation from the client device; monitoring including the monitoring unit monitoring a first port that is a connection interface for an unencrypted communication with the processing unit and a second port that is a connection interface for an encrypted communication with the processing unit, denies a connection request via the first port to the processing unit, and accepts a connection request via the second port to the processing unit; and communicating including the encrypted communication unit performing an encrypted communication with the client device, when a connection request encrypted with either one of the first port and the second port specified as a forwarding destination port is received, decrypting the connection request, and transferring decrypted connection request to the monitoring unit via the forwarding destination port. When the connection request is accepted, the processing includes the processing unit performing the predetermined process by an encrypted communication with the client device via the second port and the encrypted communication unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an embedded apparatus, a remote-processing method, and a computer program product according to the present invention are described in detail below with reference to the accompanying drawings. In the embodiments, an image forming apparatus is employed as an example of the embedded apparatus. The image forming apparatus is, for example, a copier, a printer, a scanner, a facsimile machine, or an MFP that includes at least two of a copier function, a scanner function, a printer function, and a facsimile function. However, the present invention is not limited thereto, and the present invention can be applied to any embedded apparatus.

Figure 1:
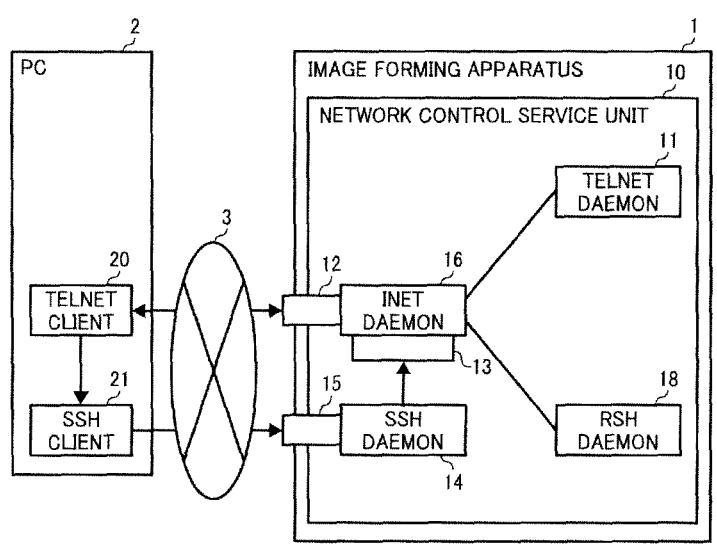
FIG. 1 is a block diagram of a network configuration of a remote-processing system and a functional configuration of an image forming apparatus according to a first embodiment of the present invention.

FIG. 1 is a block diagram of a network configuration of an image forming system and functional configurations of a personal computer (PC) 2 and an image forming apparatus 1 according to the first embodiment of the present invention. In the image forming system, the image forming apparatus 1 as the embedded apparatus, such as a facsimile machine, a printer, a copier, and an MFP thereof, and the PC 2 as a client device are communicatably connected through a network 3 including a local area network (LAN) and the Internet.

The image forming apparatus 1 is realized by a microcomputer including a central processing unit (CPU), a read only memory (ROM), and a random access memory (RAM), and includes a network control service unit 10, a control unit that controls the entire apparatus, a display unit, an input unit, and a function unit for image formation. The control unit, the display unit, the input unit, and the function unit are well known, so that these units are not shown and explanation thereof is omitted.

The network control service unit 10 provides various server functions related to the network control to the PC 2 as the client device, and includes an external port 12, an internal port 13, an inet daemon (INETD) 16, a telnet daemon (TLNTD) 11, an rsh (remote shell) daemon (RSHD) 18, and an SSH daemon (SSHD) 14. In FIG. 1, each daemon has already been started. The external port 12 is an external port for the telnet daemon 11 and functions as a connection interface (I/F) for unencrypted communication between inside and outside of the image forming apparatus 1. The internal port 13 is an internal port for the telnet daemon 11 and functions as a communication I/F for encrypted communication in the image forming apparatus 1.

The telnet daemon 11 operates as a processing unit and is a function unit that provides a telnet server function of the image forming apparatus 1 to the PC 2. The telnet daemon 11 in the present embodiment functions only as a management program that executes various settings or reference or change of the settings for an administrator of the image forming apparatus 1, which is different from a telnet service used in Unix. Therefore, the telnet daemon 11 cannot access a file system and execute commands provided in an OS.

The rsh daemon 18 operates as a processing unit and is a function unit that provides an rsh server function to the PC 2.

The SSH daemon 14 operates as a processing unit and is a function unit that provides an SSH server function of the image forming apparatus 1 to the PC 2. The SSH daemon 14 includes an external port 15 as a communication I/F for data transfer from an external device such as the PC 2, and the SSH daemon 14 operating as an encrypted communication unit performs the encrypted communication with the PC 2 via the external port 15.

The SSH daemon 14 is different from an SSH daemon provided in UNIX as the telnet daemon 11 is limited in function of the telnet service provided in UNIX, and only provides a login function by the encrypted communication, so that a shell cannot be started. Moreover, the SSH daemon 14 includes a port forwarding function, with which the SSH daemon 14 can provide a service equivalent to the telnet daemon 11.

A telnet connection request is a connection request to the telnet daemon 11. An SSH connection request is a connection request to the SSH daemon 14. In the case of connecting the PC 2 to the telnet daemon 11 by using the port forwarding function of the SSH, when the SSH connection request specifying the port of the telnet daemon 11 as a forwarding destination port is made, the SSH daemon 14 transfers the SSH connection request to the port of the telnet daemon 11 as the forwarding destination included in the received SSH connection request as the telnet connection request, which is the port forwarding function in the SSH service.

More specifically, the SSH daemon 14 receives the SSH connection request, in which any one of the external port 12 and the internal port 13 is specified as the forwarding destination port and which is encrypted, from the PC 2 via the external port 15. Then, the SSH daemon 14 operating as an encrypted communication unit decrypts the received SSH connection request, extracts the forwarding destination port from the decrypted SSH connection request, and transfers the decrypted SSH connection request to the inet daemon 16 as the telnet connection request via the extracted forwarding destination port.

The inet daemon 16 manages and controls each daemon such as the telnet daemon 11 and the rsh daemon 18, and starts each daemon according to need.

Moreover, the inet daemon 16, operating as a monitoring unit, always monitors the external port 12 and the internal port 13 of the telnet daemon 11. When the net daemon 16 receives the telnet connection request from the external port 12, the inet daemon 16 denies the telnet connection request. When the inet daemon 16 receives the telnet connection request that is transferred by the port forwarding function of the SSH daemon 14 via the external port 12, the Met daemon 16 denies the telnet connection request. On the other hand, when the Met daemon 16 receives the telnet connection request that is transferred by the port forwarding function of the SSH daemon 14 via the internal port 13, the inet daemon 16 accepts the telnet connection request and transfers it to the telnet daemon 11. In this manner, it is possible to perform processes, such as various settings and reference and update of the various settings using the telnet service, from the PC 2 by the encrypted communication with high security by using the port forwarding function of the SSH daemon 14 and further accepting only the telnet connection request that is transferred by the port forwarding function from the SSH daemon 14 via the internal port 13 and connecting to the telnet daemon 11.

The PC 2 is realized by a microcomputer including a CPU, a ROM, and a RAM, and includes a telnet client (TNC) 20, an SSH client (SSHC) 21, a control unit that controls the entire apparatus, a display unit, and an input unit. The control unit, the display unit, and the input unit are well known, so that these units are not shown and explanation thereof is omitted.

The telnet client 20 is a function unit that provides a client function of the telnet connection to the telnet server function of the image forming apparatus 1.

The SSH client 21 is a function unit that provides a client function of the SSH port forwarding connection to the SSH server function of the image forming apparatus 1.

Figure 2:
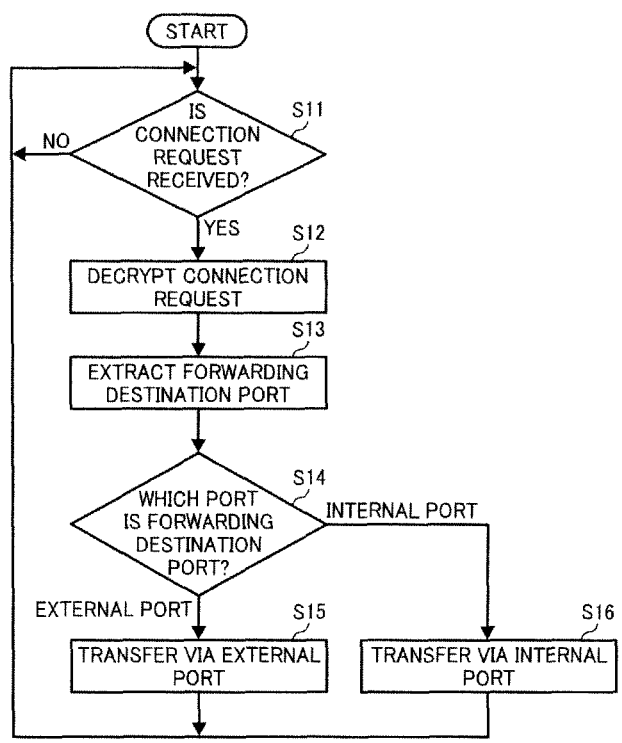
FIG. 2 is a flowchart of a process performed by an SSH daemon according to the first embodiment.

A network connection process by the image forming apparatus 1 is explained below with reference to FIG. 2. FIG. 2 is a flowchart of a connection-request transferring process by the SSH daemon 14 according to the first embodiment.

The SSH daemon 14 is in a standby state for receiving the SSH connection request via the external port 15 (No at Step S11). When the SSH daemon 14 receives the SSH connection request (Yes at Step S11), the SSH daemon 14 decrypts the received SSH connection request because the SSH connection request is encrypted (Step S12). The SSH daemon 14 extracts a forwarding destination port specified to a predetermined position in a packet of the decrypted SSH connection request (Step S13). Then, the SSH daemon 14 determines the extracted forwarding destination port (Step S14).

If the forwarding destination port is the external port 12, the SSH daemon 14 transfers the decrypted SSH connection request to the inet daemon 16 via the external port 12 as the telnet connection request (Step S15). If the forwarding destination port is the internal port 13, the SSH daemon 14 transfers the decrypted SSH connection request to the inet daemon 16 via the internal port 13 as the telnet connection request (Step S16). In this manner, the SSH connection request that the SSH daemon 14 received from the PC 2 is transferred to the inet daemon 16 as the telnet connection request by the port forwarding function.

Figure 3:
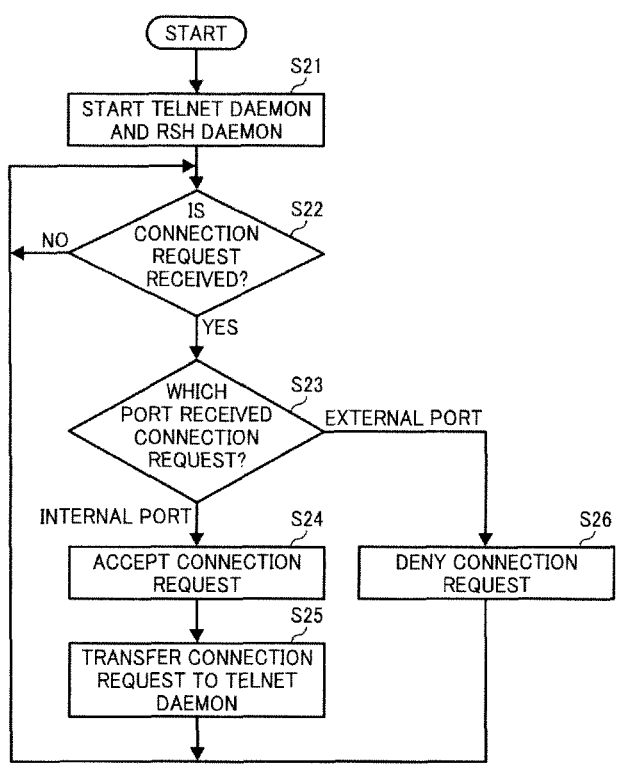
FIG. 3 is a flowchart of a process performed by an inet daemon according to the first embodiment.

FIG. 3 is a flowchart of a permission determining process for the connection request by the inet daemon 16 according to the first embodiment. When the inet daemon 16 is started, the inet daemon 16 starts the telnet daemon 11 and the rsh daemon 18 (Step S21) to establish a pipe connection to each daemon.

Then, the inet daemon 16 becomes a standby state for receiving the connection request (No at Step S22). When the inet daemon 16 receives the telnet connection request (Yes at Step S22), the inet daemon 16 determines the port of the received telnet connection request (Step S23). The inet daemon 16 can determine the port by checking a portion of the port specified in the packet of the telnet connection request or can ask each port (the external port 12 and the internal port 13) for a telnet connection request packet sequentially and determine that the port from which the telnet connection request packet is received as the port of the received telnet connection request.

If the port that received the telnet connection request is the internal port 13, the inet daemon 16 accepts the received telnet connection request (Step S24) and transfers it to the telnet daemon 11 (Step S25). Whereby, the connection of the telnet client 20 and the telnet daemon 11 is established.

On the other hand, at Step S23, if the port that received the telnet connection request is the external port 12, the inet daemon 16 denies the received telnet connection request (Step S26) and does not connect the telnet client 20 to the telnet daemon 11. Whereby, the telnet connection by the unencrypted communication can be avoided.

Figure 4:
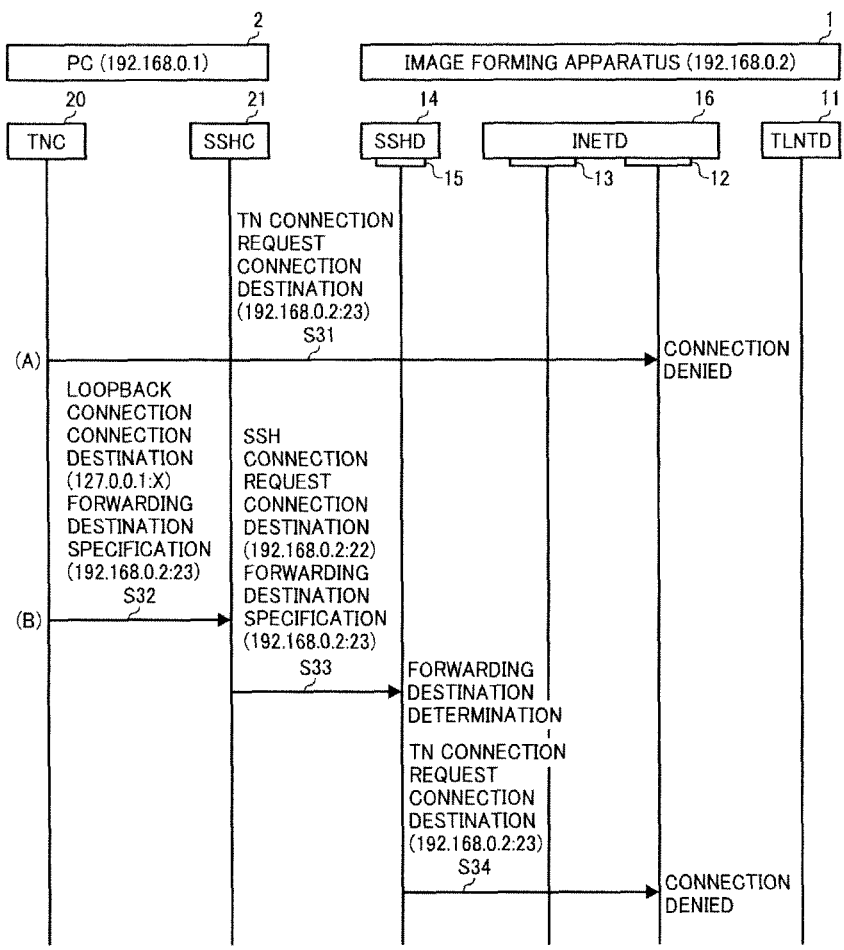
FIG. 4 is a sequence diagram of an example of refusal to a telnet connection request.

A specific example of a process to the telnet connection request is explained below. FIG. 4 is a sequence diagram of an example of refusal to the telnet connection request. Internet protocol (IP) addresses of the image forming apparatus 1 and the PC 2 are (192.168.0.2) and (192.168.0.1), respectively. The port number of the external port 12 is 23. The connection destination and the forwarding destination of the telnet connection request are specified in the connection request packet in the form of (IP address: port number). In the drawings and the following explanation, a TN connection request indicates the telnet connection request.

As shown in (A) in FIG. 4, when the connection request (the TN connection request) is made from the telnet client 20 via the network 3 through telnet that is the unencrypted communication, specifying the external port 12 that is the connection destination (192.168.0.2:23) of the image forming apparatus 1 (Step S31), because the port that received the telnet connection request is determined to be the external port 12 at Step S23, the inet daemon 16 denies the telnet connection request.

In this manner, the inet daemon 16 can prevent the telnet connection in plain text.

Next, it is explained of a case of using the SSH port forwarding when the PC 2 makes the telnet connection request to the image forming apparatus 1.

As shown in (B) in FIG. 4, the telnet client 20 establishes a loopback connection to the SSH client 21 that is the forwarding destination (127.0.0.1:X) (X is an arbitrary port number), specifying the external port 12 that is the forwarding destination (192.168.0.2:23) of the connection request (Step S32). Then, the SSH client 21 makes the connection request (the SSH connection request) through the SSH that is the encrypted communication, specifying the external port 12 that is the forwarding destination (192.168.0.2:23), to the external port 15 that is the connection destination (192.168.0.2:22) (the number "22" indicates the external port 15) of the image forming apparatus 1 via the network 3 (Step S33).

The SSH daemon 14 decrypts the SSH connection request from the PC 2 and determines the forwarding destination, and transfers the SSH connection request to the external port 12 indicated as the forwarding destination (192.168.0.2:23) as the telnet connection request (Step S34). Because the telnet connection request is the connection request to the external port 12, the inet daemon 16 denies the connection by the above Steps S23 and S26.

In this manner, the inet daemon 16 denies the connection request to the external port 12 that is a connection I/F for the unencrypted communication.

Figure 5:
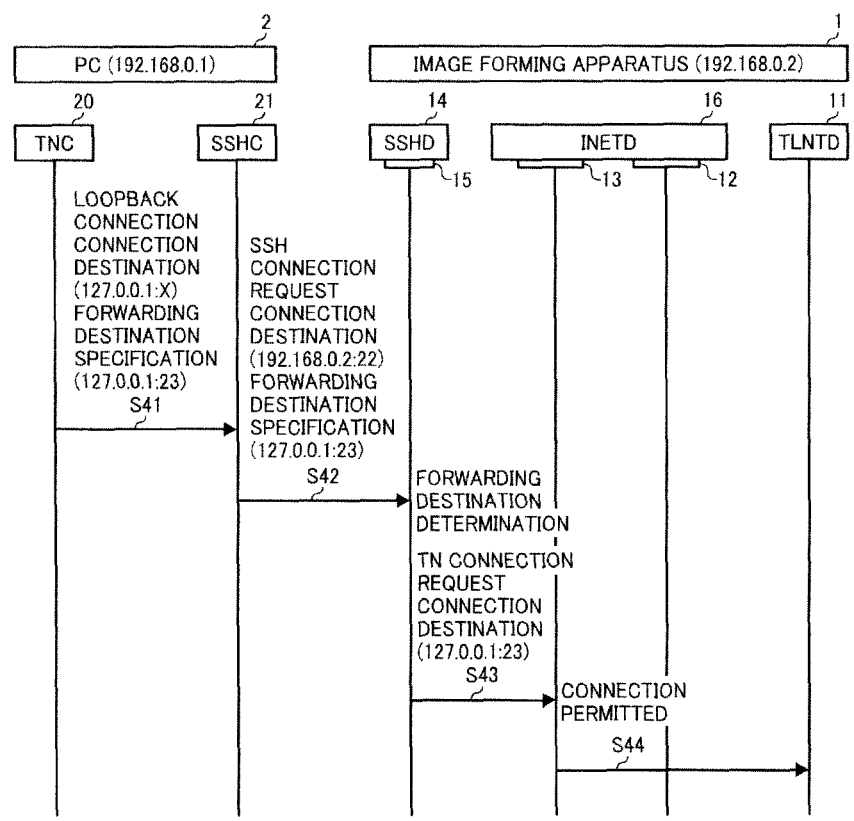
FIG. 5 is a sequence diagram of an example of permission to the telnet connection request.

Next, a case is explained in which the SSH port forwarding function is used to connect the PC 2 to the image forming apparatus 1 when the PC 2 makes the telnet connection request to the image forming apparatus 1. FIG. 5 is a sequence diagram of an example of permission to the telnet connection request. The port number of the external port 15 is set to 22, and the port number of the internal port 13 is set to 23. In the similar manner to the example shown in FIG. 4, the connection destination and the forwarding destination are specified by (IP address: port number).

The telnet client 20 establishes a loopback connection to the SSH client 21 that is the connection destination (127.0.0.1:X) (X is an arbitrary port number), specifying the internal port 13 that is the forwarding destination (127.0.0.1:23) of the connection request (Step S41). Then, the SSH client 21 makes the connection request (the SSH connection request) through the SSH that is the encrypted communication, specifying the internal port 13 that is the forwarding destination (127.0.0.1:23), to the external port 15 that is the connection destination (192.168.0.2:22) of the image forming apparatus 1 via the network 3 (Step S42).

The SSH daemon 14 decrypts the SSH connection request from the PC 2 and determines the forwarding destination, and transfers the SSH connection request to the internal port 13 indicated as the forwarding destination (127.0.0.1:23) as the telnet connection request (Step S43). Because the telnet connection request is the connection request to the internal port 13, the inet daemon 16 permits the connection by the above Steps S23 and S24 (Step S44).

In this manner, the TN connection from the telnet client 20 to the telnet daemon 11 is permitted, so that the image forming apparatus 1 enables a user to utilize the telnet server function from the PC 2.

According to the present embodiment, the telnet connection request from the external port 12 and the telnet connection request that is transferred from the SSH daemon 14 via the external port 12, which are premised on the unencrypted communication, are denied, and only the telnet connection request by the encrypted communication from the SSH daemon 14 via the internal port 13 is accepted. Therefore, a conventional telnet daemon can be used without change in the present embodiment. Thus, it is possible to perform the remote processes, such as various settings and change and reference of the various settings, from the PC 2 while development effort is reduced and security is surely improved by a simple method.

Figure 6:
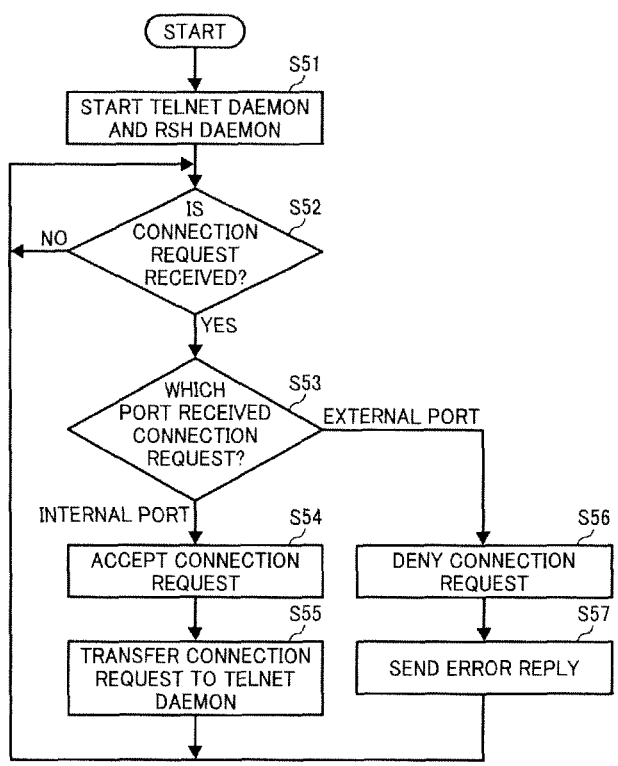
FIG. 6 is a flowchart of a process performed by the inet daemon according to a modified example of the first embodiment.
Figure 7:
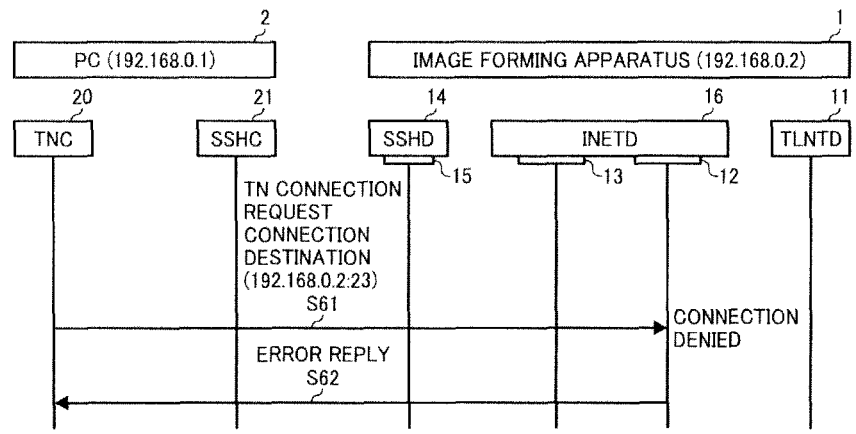
FIG. 7 is a sequence diagram of a process of an error reply to the telnet connection request according to the modified example of the first embodiment.

A modified example of the first embodiment is explained below. When the telnet connection request is made from the PC 2 to the external port 12, an error reply or a message to make the connection request specifying the transfer to the internal port 13 by the encrypted communication can be sent to the PC 2. FIG. 6 is a flowchart of a connection-request determining process by the inet daemon 16 according to the modified example of the first embodiment. FIG. 7 is a sequence diagram of an error reply process when the telnet connection request is received according to the modified example of the first embodiment.

The processes from Step S51 (start process of each daemon) to Step S53 (determination of a port that received a connection request) are performed in the similar manner to Steps S21 to S23 in the first embodiment.

At Step S53, if the port that received the telnet connection request is the external port 12, the inet daemon 16 denies the telnet connection request as in the first embodiment (Step S56). Furthermore, the inet daemon 16 sends the error reply (connection error message) to the PC 2 (Step S57).

More specifically, as shown in FIG. 7, when the inet daemon 16 receives the telnet connection request by the encrypted communication via the external port 12 that is the connection destination (192.168.0.2:23) (the number "23" indicates the external port 12) (Step S61), the inet daemon 16 denies the connection request, and further sends the connection error message to the telnet client 20 (Step S62). At Step S53, the processes (Steps S54 and S55) when the port that received the telnet connection request is the internal port 13 are performed in the similar manner to Steps S24 and S25 in the first embodiment.

Figure 8:
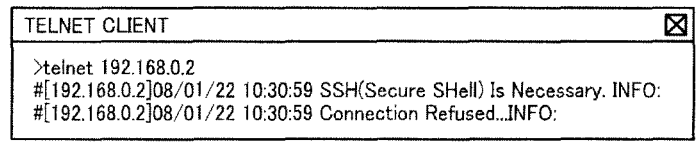
FIG. 8 is a schematic diagram of a display example of the error reply when an external-port connection error occurs.

FIG. 8 is a schematic diagram of a display example of the error reply from the image forming apparatus 1 when an external-port connection error occurs in the PC 2. When the telnet client 20 is connecting directly to the telnet daemon 11, the display unit of the PC 2 displays an error message of the error reply sent from the image forming apparatus 1, or a message indicating that the connection through the SSH is needed.

In this manner, when the connection request by the unencrypted communication is made by a user, the error reply and the reply indicating that the SSH connection is needed are sent, so that the user who is going to establish the connection by the unencrypted communication can be led to the encrypted communication.

Instead of the error reply as shown in FIG. 8, it is also possible to send from the inet daemon 16 or the like to the PC 2 an error message to make the connection request specifying the transfer to the internal port 13 by the encrypted communication by the port forwarding function. Specifically, the inet daemon 16 sends the error message to the PC 2 using the messenger function of a server messenger block (SMB).

Figure 9:
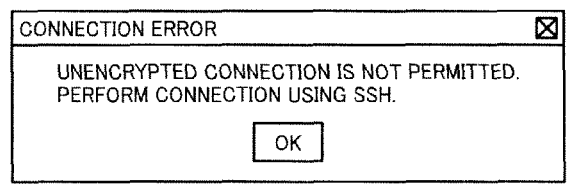
FIG. 9 is a schematic diagram of a display example of an error message when the external-port connection error occurs.

FIG. 9 is a schematic diagram of a display example of the message to make the connection request specifying the transfer to the internal port 13 by the encrypted communication by the port forwarding function. As shown in FIG. 9, when the inet daemon 16 receives the telnet connection request from the external port 12 by the encrypted communication, the inet daemon 16 denies the telnet connection request and further sends the message to make the connection request of communication through telnet specifying the internal port 13 as the forwarding destination to the SSH daemon 14.

In this manner, when a user makes the connection request by the unencrypted communication, a message prompting the user to establish the connection via the port forward is sent, so that the image forming apparatus 1 can provide a method to solve a problem to a user who tried to establish the connection by the unencrypted communication and lead the user to the encrypted communication.

In the first embodiment, when the telnet connection request is made directly from the PC 2 via the external port 12, the connection request is denied. In a second embodiment, even when the telnet connection request is made directly from the PC 2 via the external port 12, if the telnet connection request is made by the encrypted communication such as the IPsec, the connection request is accepted.

Figure 10:
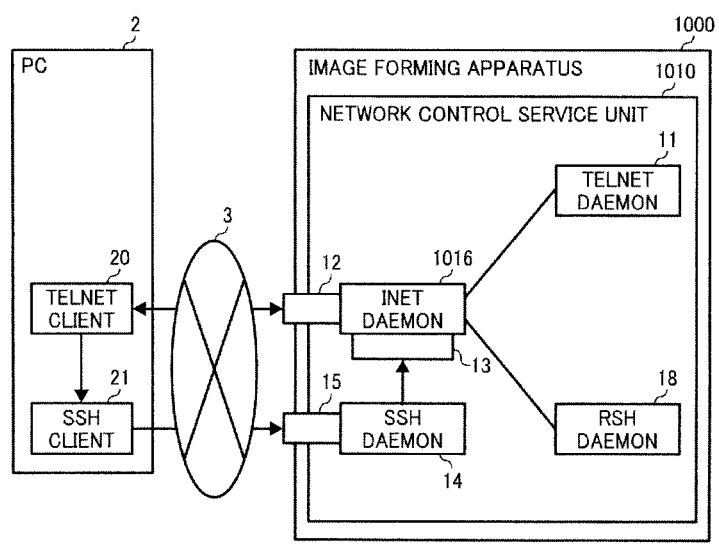
FIG. 10 is a block diagram of a network configuration of a remote-processing system and a functional configuration of an image forming apparatus according to a second embodiment of the present invention.

FIG. 10 is a block diagram of a network configuration of an image forming system and functional configurations of the PC 2 and an image forming apparatus 1000 according to the second embodiment of the present invention. The network configuration and the functional configuration of the PC 2 are the same as those in the first embodiment.

In the present embodiment, the image forming apparatus 1000 includes a network control service unit 1010. The network control service unit 1010 operates as a processing unit, like the network control service unit 10 in the first embodiment, and includes the external ports 12 and 15, the internal port 13, an inet daemon 1016, the SSH daemon 14, the telnet daemon 11, and the rsh daemon 18. The functions and the configurations of the external ports 12 and 15, the internal port 13, the SSH daemon 14, the telnet daemon 11, and the rsh daemon 18 are the same as those in the first embodiment.

In the similar manner to the inet daemon 16 in the first embodiment, when the telnet connection request is transferred from the SSH daemon 14 to the inet daemon 1016 by the port forwarding function, if it is transferred via the internal port 13, the inet daemon 1016 accepts the connection request. However, if the telnet connection request is transferred via the external port 12, the inet daemon 1016 denies the connection request.

Moreover, even when the inet daemon 1016 receives the telnet connection request directly from the PC 2 via the external port 15, if it is through the encrypted communication by the IPsec, the inet daemon 1016 accepts the telnet connection request. However, if it is by the unencrypted communication, the inet daemon 1016 denies the telnet connection request. Whether the inet daemon 1016 receives the telnet connection request through the encrypted communication by the IPsec is determined based on presence/absence of a negotiation with the PC 2 performed in the IPsec such as a key exchange, a packet of the received connection request, or the like.

Figure 11:
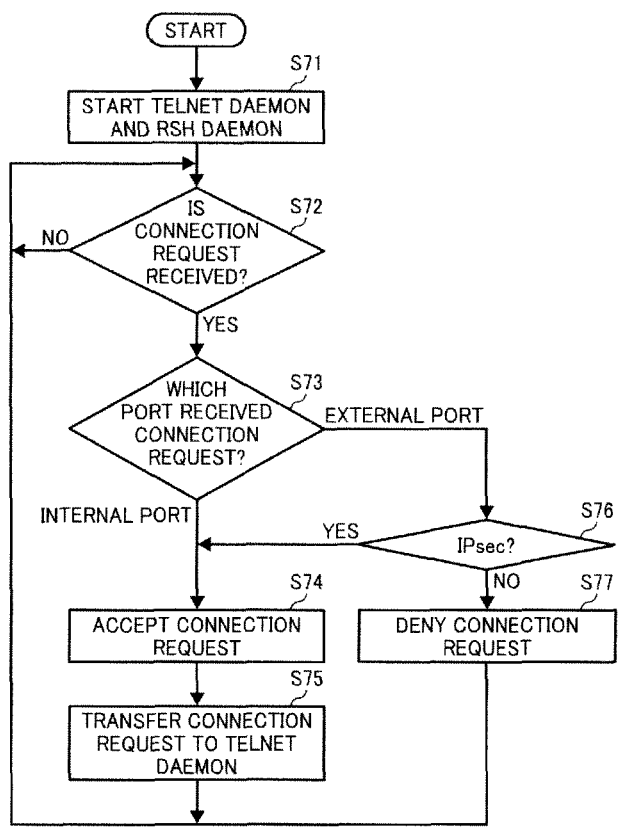
FIG. 11 is a flowchart of a process performed by the inet daemon according to the second embodiment.

A connection-request determining process by the image forming apparatus 1000 is explained below. FIG. 11 is a flowchart of the connection-request determining process by the inet daemon 1016 according to the second embodiment.

The processes from Step S71 (start process of each daemon) to Step S73 (determination of a port that received a connection request) are performed in the similar manner to Steps S21 to S23 in the first embodiment.

At Step S73, if the port that received the telnet connection request is the external port 12, the inet daemon 1016 determines whether the inet daemon 1016 receives the telnet connection request by the IPsec (Step S76). If the inet daemon 1016 does not receive the telnet connection request by the IPsec (No at Step S76), the inet daemon 1016 denies the telnet connection request as in the first embodiment (Step S77). If the inet daemon 1016 receives the telnet connection request by the IPsec (Yes at Step S76), the inet daemon 1016 accepts the telnet connection request (Step S74) and transfers the telnet connection request to the telnet daemon 11 (Step S75).

Figure 12:
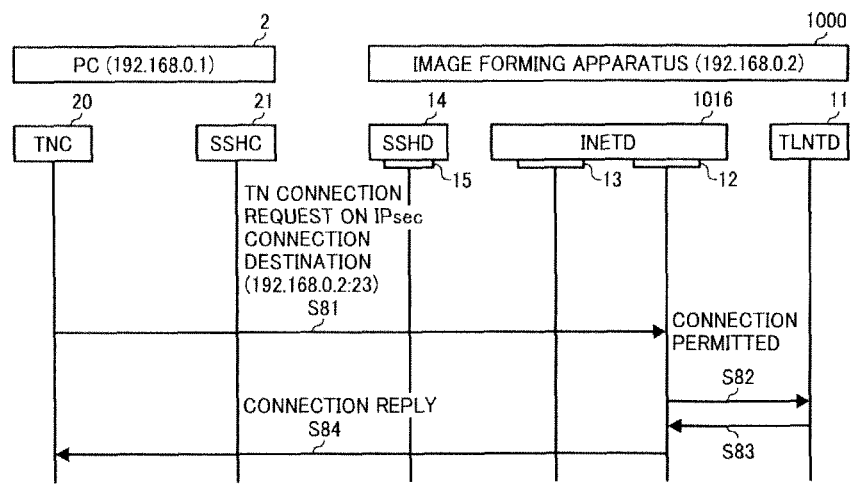
FIG. 12 is a sequence diagram of a telnet connection when using a security architecture for Internet protocol (IPSec) according to the second embodiment.

FIG. 12 is a sequence diagram of a telnet connection when using the IPsec.

When the connection request (the TN connection request on IPsec) is made from the telnet client 20 to the external port 12 that is the connection destination (192.168.0.2:23) (the number "23" indicates the external port) of the telnet daemon 11 of the image forming apparatus 1000 via the network 3 by communication through telnet by the IPsec communication (Step S81), the inet daemon 1016 permits the connection (Step S82) and makes a connection reply to the telnet client 20 (Steps S83 and S84).

According to the present embodiment, when the inet daemon 1016 receives the telnet connection request via the external port directly from the PC 2 by the encrypted communication by the IPsec (not by the port forwarding function of the SSH daemon 14), the inet daemon 1016 permits the connection. Therefore, the telnet client 20 can be directly connected to the telnet daemon 11 and receive the telnet connection request without via the port forwarding function of the SSH daemon 14. Thus, the image forming apparatus 1000 need not require the PC 2 to further encrypt the telnet connection request that has already been protected by the IPsec, enabling to reduce the load on a user.

In the first embodiment, when the SSH daemon 14 receives the SSH connection request from the PC 2, the SSH daemon 14 transfers the connection request to the forwarding destination port specified in the connection request. In a third embodiment, when the SSH connection request is received from the PC 2, if the forwarding destination port is the external port, the connection request is transferred after changing the forwarding destination port to the internal port.

Figure 13:
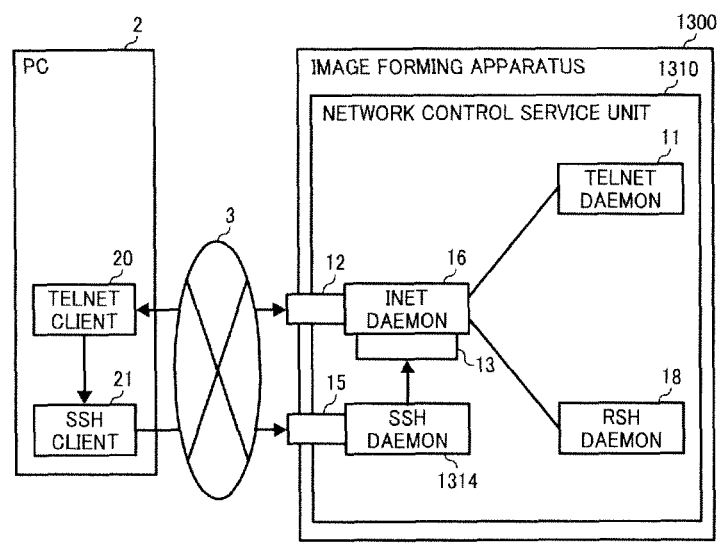
FIG. 13 is a block diagram of a network configuration of a remote-processing system and a functional configuration of an image forming apparatus according to a third embodiment of the present invention.

FIG. 13 is a block diagram of a network configuration of an image forming system and functional configurations of the PC 2 and an image forming apparatus 1300 according to the third embodiment of the present invention. The network configuration and the functional configuration of the PC 2 are the same as those in the first embodiment.

In the present embodiment, the image forming apparatus 1300 includes a network control service unit 1310. The network control service unit 1310 includes the external ports 12 and 15, the internal port 13, the inet daemon 16, an SSH daemon 1314, the telnet daemon 11, and the rsh daemon 18. The functions and the configurations of the external ports 12 and 15, the internal port 13, the inet daemon 16, the telnet daemon 11, and the rsh daemon 18 are the same as those in the first embodiment.

In the similar manner to the SSH daemon 14 in the first embodiment, when the SSH daemon 1314 operating as an encrypted communication unit receives the SSH connection request, the SSH daemon 1314 decrypts the received SSH connection request and extracts the forwarding destination port specified in the SSH connection request. Then, the SSH daemon 1314 determines the extracted forwarding destination port. If the extracted forwarding destination port is the external port, the SSH daemon 1314 changes the forwarding destination port to the internal port and transfers the connection request to the inet daemon 16 via the internal port 13 as the telnet connection request.

Figure 14:
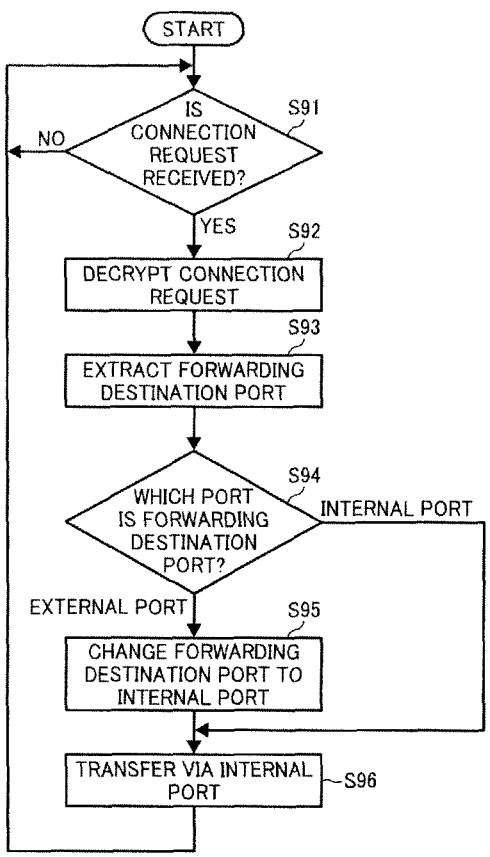
FIG. 14 is a flowchart of a process performed by an SSH daemon according to the third embodiment.

A connection-request transferring process by the SSH daemon 1314 is explained below. FIG. 14 is a flowchart of the connection-request transferring process by the SSH daemon 1314 according to the third embodiment.

The processes from Step S91 (standby state for receiving a connection request) to Step S93 (extraction of a forwarding destination port) are performed in the similar manner to Steps S11 to S13 in the first embodiment.

When the SSH daemon 1314 extracts the forwarding destination port from the SSH connection request, the SSH daemon 1314 determines the port number of the extracted forwarding destination port (Step S94). If the port number of the external port 12 is specified as the forwarding destination port, the SSH daemon 1314 changes the forwarding destination port to the port number of the internal port 13 (Step S95) and transfers the decrypted SSH connection request to the inet daemon 16 via the internal port 13 as the telnet connection request (Step S96).

On the other hand, if the port number of the internal port 13 is specified as the forwarding destination port, the SSH daemon 1314 transfers the decrypted SSH connection request to the inet daemon 16 via the internal port 13 as the telnet connection request without changing the forwarding destination port at Step S95 (Step S96).

Figure 15:
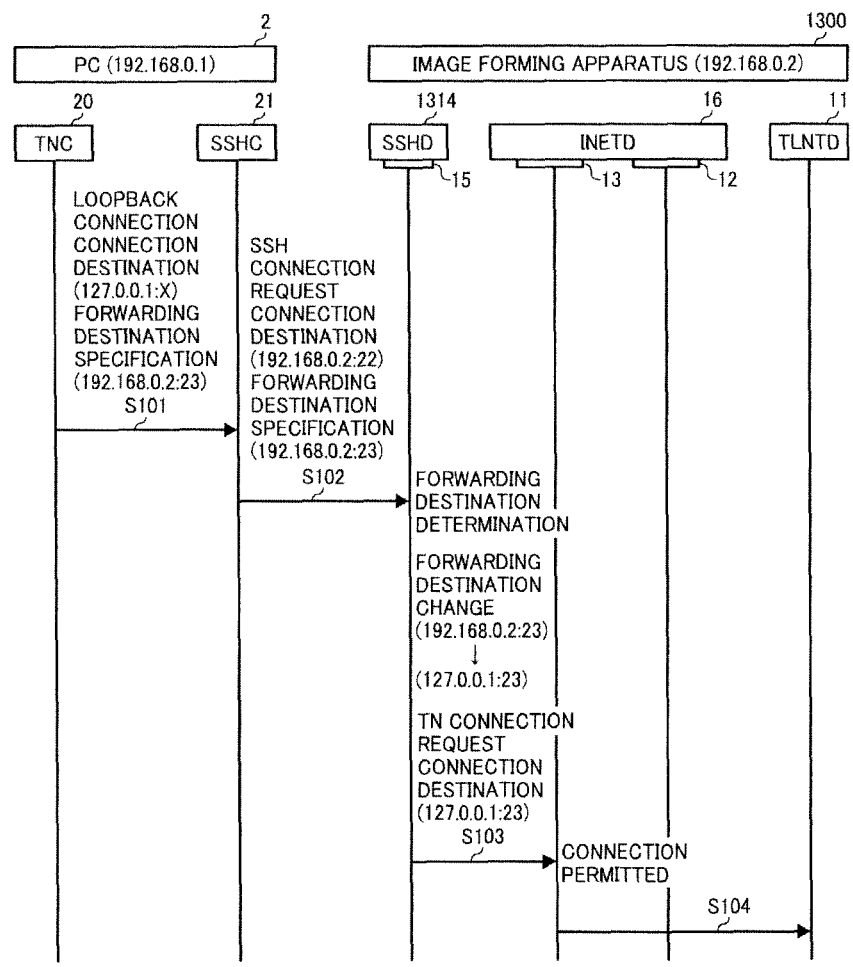
FIG. 15 is a sequence diagram of an example of a process of the telnet connection request according to the third embodiment.

FIG. 15 is a sequence diagram of an example of a process when the telnet connection request is made according to the third embodiment.

The telnet client 20 establishes a loopback connection to the SSH client 21 that is the connection destination (127.0.0.1:X) (X is an arbitrary port number), specifying the external port 12 that is the forwarding destination (192.168.0.2:23) of the connection request (Step S101). Then, the SSH client 21 makes the connection request (the SSH connection request) through the SSH that is the encrypted communication, specifying the external port 12 that is the forwarding destination (192.168.0.2:23), to the external port 15 of the SSH daemon 1314 that is the connection destination (192.168.0.2:23) of the image forming apparatus 1300 via the network 3 (Step S102).

When the SSH daemon 1314 receives the SSH connection request from the PC 2, the SSH daemon 1314 decrypts the SSH connection request and determines the forwarding destination. Then, the SSH daemon 1314 changes the address of the forwarding destination (192.168.0.2:23) indicating the external port 12 to the address of the forwarding destination (127.0.0.1:23) indicating the internal port 13 (Step S95), and transfers the SSH connection request to the internal port 13 indicated as the forwarding destination (127.0.0.1:23) as the telnet connection request (Step S103). Because the telnet connection request is the connection request to the internal port 13, the inet daemon 16 permits the connection (Step S104). In this manner, the telnet connection from the telnet client 20 to the telnet daemon 11 is permitted, so that the image forming apparatus 1300 can enable a user to always use the telnet service from the PC 2.

According to the present embodiment, when the forwarding destination of the port forwarding is the external port 12, the SSH daemon 1314 changes the forwarding destination port to the internal port 13. Therefore, it is avoided that when the external port 12 does not accept the connection request, the connection request is denied even if the connection request uses the port forwarding function.

In the first to third embodiments, the connection request is made from the PC 2 to the telnet daemon 11 to receive the telnet service; however, in a fourth embodiment, an FTP daemon as a processing unit is used to receive the telnet service.

Figure 16:
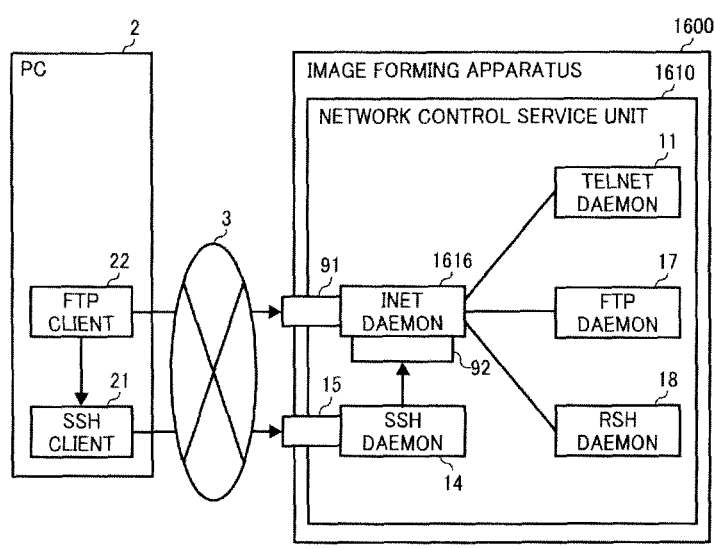
FIG. 16 is a block diagram of a network configuration of a remote-processing system and a functional configuration of an image forming apparatus according to a fourth embodiment of the present invention.

FIG. 16 is a block diagram of a network configuration of an image forming system and functional configurations of the PC 2 and an image forming apparatus 1600 according to the fourth embodiment of the present invention. The network configuration and the functional configuration of the PC 2 are the same as those in the first embodiment.

In the present embodiment, the image forming apparatus 1600 includes a network control service unit 1610. The network control service unit 1610 includes an external port 91, the external port 15, an internal port 92, an inet daemon 1616, the SSH daemon 14, the telnet daemon 11, an FTP daemon (FTPD) 17, and the rsh daemon 18. The functions and the configurations of the external port 15, the SSH daemon 14, the telnet daemon 11, and the rsh daemon 18 are the same as those in the first embodiment.

The external port 91 is an external port for the FTP daemon 17 and functions as a communication I/F for unencrypted communication between inside and outside of the image forming apparatus 1600. The internal port 92 is an internal port for the FTP daemon 17 and functions as a communication I/F for encrypted communication in the image forming apparatus 1600. The FTP daemon 17 is a daemon that is started by the inet daemon 1616 and performs a file transfer according to the FTP. An FTP connection request indicates a connection request to the FTP daemon 17.

In the case of connecting the PC 2 to the FTP daemon 17 by using the port forwarding function of the SSH, when the SSH connection request specifying the port of the FTP daemon 17 as the forwarding destination port is made, the SSH daemon 14 transfers the SSH connection request to the port of the FTP daemon 17 as the forwarding destination included in the received SSH connection request as the FTP connection request.

More specifically, the SSH daemon 14 receives the SSH connection request, in which any one of the external port 91 and the internal port 92 is specified as the forwarding destination port and which is encrypted, from the PC 2 via the external port 15. Then, the SSH daemon 14 decrypts the received SSH connection request, extracts the forwarding destination port from the decrypted SSH connection request, and transfers the decrypted SSH connection request to the inet daemon 1616 as the FTP connection request via the extracted forwarding destination port.

In the similar manner to the inet daemon 16 in the first embodiment, the inet daemon 1616 manages and controls each daemon such as the telnet daemon 11, the FTP daemon 17, and the rsh daemon 18, and starts each daemon according to need.

Moreover, the inet daemon 1616, operating as a monitoring unit, always monitors the external port 91 and the internal port 92 of the telnet daemon 11. When the Met daemon 1616 receives the FTP connection request from the external port 91, the Met daemon 1616 denies the FTP connection request. When the inet daemon 1616 receives the FTP connection request that is transferred by the port forwarding function of the SSH daemon 14 via the external port 91, the inet daemon 1616 denies the FTP connection request. On the other hand, when the inet daemon 1616 receives the FTP connection request that is transferred by the port forwarding function of the SSH daemon 14 via the internal port 92, the inet daemon 1616 accepts the FTP connection request and transfers it to the FTP daemon 17. In this manner, it is possible to perform processes, such as various settings and reference and update of the various settings using the FTP service, from the PC 2 by the encrypted communication with high security by using the port forwarding function of the SSH daemon 14 and further accepting only the FTP connection request that is transferred by the port forwarding function from the SSH daemon 14 via the internal port 92 and connecting to the FTP daemon 17.

In the present embodiment, the PC 2 includes an FTP client (FTPC) 22 instead of the telnet client 20. The FTP client 22 is a function unit that provides a client function of a file transfer with the FTP daemon 17 as a server.

Figure 17:
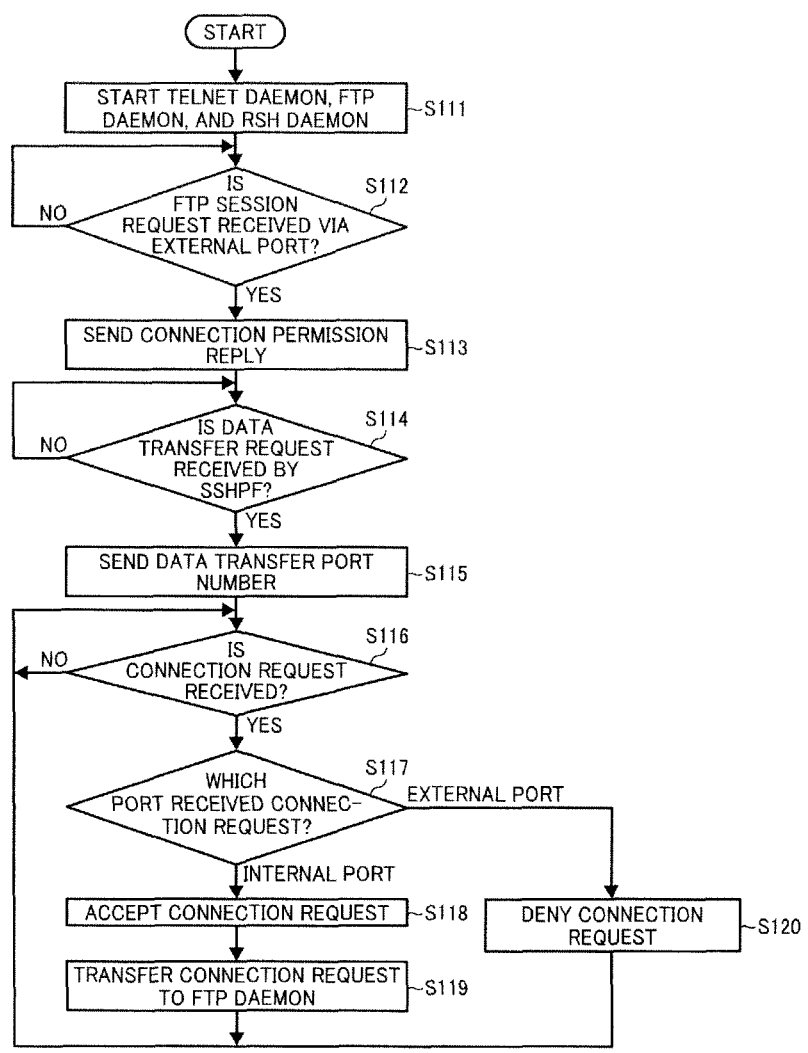
FIG. 17 is a flowchart of a process performed by the inet daemon according to the fourth embodiment.

A network connection process by the image forming apparatus 1600 is explained below with reference to FIG. 17. FIG. 17 is a flowchart of a connection-request permission determining process by the inet daemon 1616 according to the fourth embodiment, in which the FTP data transfer is performed in passive mode.

When the inet daemon 1616 is started, the inet daemon 1616 starts the FTP daemon 17, the telnet daemon 11, and the rsh daemon 18 (Step S111) to establish a pipe connection to each daemon.

Then, the inet daemon 1616 becomes a standby state for receiving an FTP session request from the FTP client 22 via the external port 91 (No at Step S112). When the inet daemon 1616 receives the FTP session request via the external port 91 (Yes at Step S112), the inet daemon 1616 sends a connection permission request to the FTP daemon 17. When the inet daemon 1616 receives a reply to the connection permission request, the inet daemon 1616 sends a connection permission reply to the FTP client 22 (Step S113).

Then, the inet daemon 1616 becomes a standby state for receiving a data transfer request by an SSH port forwarding (SSHPF) from the FTP client 22 via the external port 91 (No at Step S114). When the inet daemon 1616 receives the data transfer request from the FTP client 22 via the external port 91 (Yes at Step S114), the inet daemon 1616 sends the data transfer request to the FTP daemon 17. When the inet daemon 1616 receives a data transfer port number from the FTP daemon 17, the inet daemon 1616 sends the data transfer port number to the FTP client 22 (Step S115).

Thereafter, in the PC 2, the SSH client 21 sends the SSH connection request in which the received port number is specified as the forwarding destination to the SSH daemon 14. The SSH daemon 14 transfers the connection request to the inet daemon 1616 as the FTP connection request via the port specified as the forwarding destination.

The inet daemon 1616 becomes a standby state for receiving the FTP connection request (No at Step S116). When the inet daemon 1616 receives the FTP connection request transferred from the SSH daemon 14 by the port forwarding function (Yes at Step S116), the inet daemon 1616 determines the port of the received FTP connection request by the method explained in the first embodiment (Step S117).

If the port that received the FTP connection request is the internal port 92, the inet daemon 1616 accepts the received FTP connection request (Step S118) and transfers it to the FTP daemon 17 (Step S119). Whereby, the connection of the FTP client 22 and the FTP daemon 17 is established.

On the other hand, at Step S117, if the port that received the FTP connection request is the external port 91, the inet daemon 1616 denies the received FTP connection request (Step S120) and does not connect the FTP client 22 to the FTP daemon 17. Whereby, the FTP connection by the unencrypted communication can be avoided.

Figure 18:
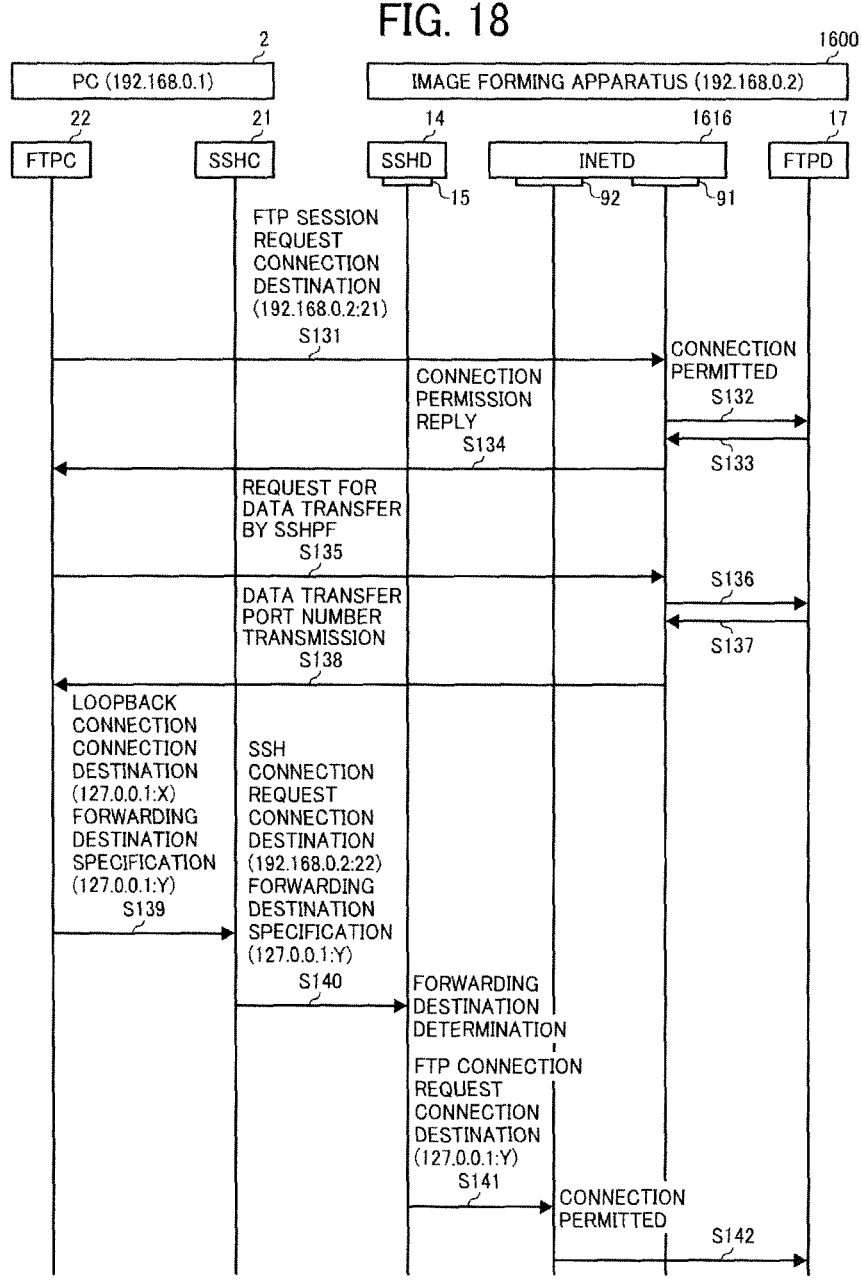
FIG. 18 is a sequence diagram of an example of a process of a file transfer protocol (FTP) connection request according to the fourth embodiment.

A specific example of a process to the FTP connection request is explained below. FIG. 18 is a sequence diagram of an example of permission to the FTP connection request using the SSH port forwarding in the FTP data transfer in passive mode. IP addresses of the image forming apparatus 1600 and the PC 2 are (192.168.0.2) and (192.168.0.1), respectively. The port number of the external port 91 is 21. The connection destination and the forwarding destination of the FTP connection request are specified in the connection request packet in the form of (IP address: port number).

First, the FTP session request is made from the FTP client 22 via the network 3, specifying the external port 91 that is the connection destination (192.168.0.2:21) of the image forming apparatus 1600 (Step S131). The inet daemon 1616 transfers the session request to the FTP daemon 17 (Step S132). When the FTP daemon 17 sends a connection permission to the inet daemon 1616 (Step S133), the inet daemon 1616 sends a connection permission reply to the FTP client 22 (Step S134).

When the FTP client 22 receives the connection permission reply, the FTP client 22 sends a data transfer request by the SSH port forwarding communication to the external port 91 (Step S135). The inet daemon 1616 transfers the data transfer request to the FTP daemon 17 (Step S136), and the FTP daemon 17 replies to the inet daemon 1616 the data transfer port number (Step S137). Then, the inet daemon 1616 sends the data transfer port number received from the FTP daemon 17 to the FTP client 22 (Step S138).

Thereafter, the FTP client 22 establishes a loopback connection to the SSH client 21 that is the forwarding destination (127.0.0.1:X) (X is an arbitrary port number), specifying the internal port 92 that is the forwarding destination (127.0.0.1:Y) (Y is an arbitrary port number) of the connection request (Step S139). Then, the SSH client 21 makes the connection request (the SSH connection request) through the SSH that is the encrypted communication, specifying the internal port 92 that is the forwarding destination (127.0.0.1:Y) (Y is an arbitrary port number), to the external port 15 that is the connection destination (192.168.0.2:22) (the number "22" indicates the external port 15) of the image forming apparatus 1600 via the network 3 (Step S140).

The SSH daemon 14 decrypts the SSH connection request from the PC 2 and determines the forwarding destination, and transfers the FTP connection request to the internal port 92 indicated as the forwarding destination (127.0.0.1:Y) (Step S141). Because the FTP connection request is the connection request to the internal port 92, the inet daemon 1616 permits the connection by the above Steps S117 and S118 (Step S142).

According to the present embodiment, the encrypted communication is specified as the connection of the data communication with the FTP, so that the image forming apparatus 1600 can prevent data to be transferred from the risk of being eavesdropped or the like.

In the present embodiment, when the external port 91 is specified as the forwarding destination in the SSH connection request, the SSH daemon 14 can be configured such that the connection request is transferred after changing the forwarding destination port to the internal port 92 in the similar manner to the second embodiment.

Figure 19:
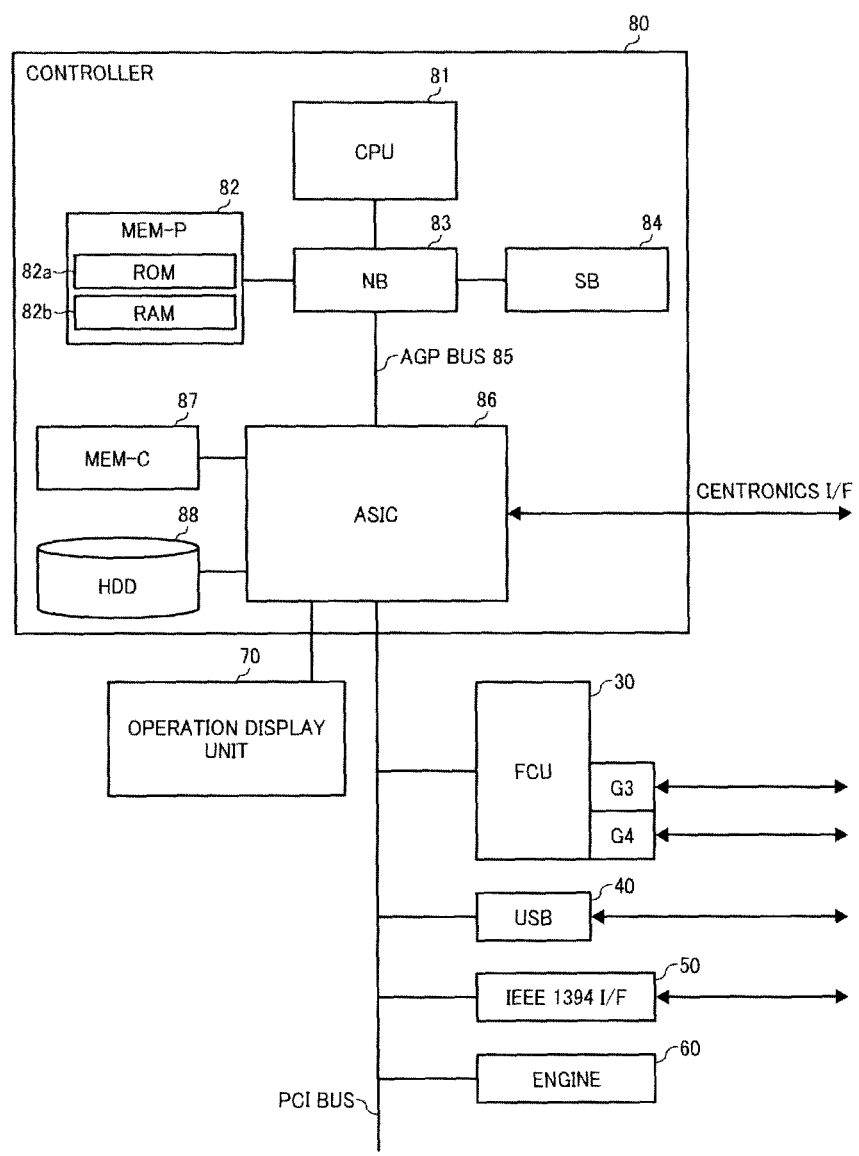
FIG. 19 is a block diagram of a hardware configuration of the image forming apparatuses according to the first to fourth embodiments of the present invention.

FIG. 19 is a block diagram of a hardware configuration of the image forming apparatuses 1, 1000, 1300, and 1600 according to the first to fourth embodiments of the present invention. As shown in FIG. 19, each of the image forming apparatuses 1, 1000, 1300, and 1600 is configured such that a controller 80 and an engine unit (Engine) 60 are connected via a peripheral component interface (PCI) bus. The controller 80 controls the entire image forming apparatus 1, image formation, communication, and input from an operation unit (not shown). The engine unit 60 is a printer engine or the like connectable to the PCI bus. For example, the engine unit 60 is a black and white plotter, a one-drum color plotter, a four-drum color plotter, a scanner, or a facsimile unit. The engine unit 60 includes, in addition to the engine part such as a plotter, an image processing unit for performing the error diffusion, the 7 conversion, and the like.

The controller 80 includes a CPU 81, a north bridge (NB) 83, a system memory (MEM-P) 82, a south bridge (SB) 84, a local memory (MEM-C) 87, an application specific integrated circuit (ASIC) 86, and a hard disk drive (HDD) 88. The NB 83 and the ASIC 86 are connected via an accelerated graphics port (AGP) bus 85. The MEM-P 82 includes a ROM 82*a* and a RAM 82*b*.

The CPU 81 controls the entire image forming apparatus 1. The CPU 81 includes a chip set including the MEM-P 82, the NB 83, and the SB 84, through which the CPU 81 is connected to other devices.

The NB 83 is a bridge for connecting the CPU 81 to the MEM-P 82, the SB 84, and the AGP bus 85, and includes a memory controller that controls read and write operations to the MEM-P 82, a PCI master, and an AGP target.

The MEM-P 82 is a system memory that is used as a memory for storing computer programs and data, a memory for loading computer programs and data, a memory for drawing in a printer, or the like, and includes the ROM 82*a* and the RAM 82*b*. The ROM 82*a* is a read-only memory used as a memory for storing computer programs and data. The RAM 82*b* is a writable and readable memory used as a memory for loading computer programs and data, a memory for drawing in the printer, or the like.

The SB 84 is a bridge for connecting the NB 83, a PCI device, and a peripheral device. The SB 84 is connected to the NB 83 via the PCI bus. A network I/F (not shown) or the like is also connected to the PCI bus.

The ASIC 86 is an integrated circuit (IC) for image processing including an image-processing hardware element, and functions as a bridge that connects the AGP bus 85, the PCI bus, the HDD 88, and the MEM-C 87 to each other. The ASIC 86 includes a PCI target, an AGP master, an arbiter (ARB) forming a core of the ASIC 86, a memory controller that controls the MEM-C 87, a plurality of direct memory access controllers (DMACs) that rotate image data by a hardware logic and the like, and a PCI unit that performs data transfer with the engine unit 60 via the PCI bus. A facsimile control unit (FCU) 30, a universal serial bus (USB) 40, and an institute of electrical and electronics engineers (IEEE) 1394 I/F 50 are connected to the ASIC 86 via the PCI bus. An operation display unit 70 is directly connected to the ASIC 86.

The MEM-C 87 is a local memory used as a copy image buffer and a code buffer. The HDD 88 is a storage that stores therein image data, computer programs, font data, and forms.

The AGP bus 85 is a bus I/F for a graphics accelerator card proposed to speed up a graphic processing. By making a direct access to the MEM-P 82 at high throughput, a graphics accelerator card speeds up.

An information processing program executed by the image forming apparatus in the above embodiments is embedded in a ROM or the like in advance and is provided.

The information processing program can be provided in such a way that the information processing program is recorded as an installable format file or executable format file in a computer-readable recording medium such as a compact disk read only memory (CD-ROM), a flexible disk (FD), a compact disk recordable (CD-R), and a digital versatile disk (DVD).

The information processing program can be stored in a computer connected to a network such as the Internet and downloaded via the network. Alternatively, the information processing program can be provided or distributed via the network such as the Internet.

A remote-processing program executed by the image forming apparatus in the above embodiments is a module structure including each unit of the network control service unit, such as the SSH daemon, the inet daemon, the telnet daemon, the rsh daemon, and the FTP daemon. As an actual hardware, the CPU reads the remote-processing program from the ROM and executes the remote-processing program. Due to this, each unit is loaded on a main storage device.

Thus, the SSH daemon, the inet daemon, the telnet daemon, the rsh daemon, and the FTP daemon are generated on the main storage device.

According to an aspect of the present invention, it is possible to perform remote processes from a client device while development effort is reduced and security is surely improved by a simple method.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An embedded apparatus that is configured to be connected to a client device via a network, the embedded apparatus comprising a processing unit that is configured through one or more programs of instructions to include:
   a processing part that performs a predetermined process by a remote operation from the client device, and
   a monitoring part that monitors a connection request from the client device for connection to the processing part, the connection request being forwarded via a first port that is a connection interface for an unencrypted communication with the processing part or via a second port that is a connection interface for an encrypted communication with the processing part; and
   an encrypted communication part that performs an encrypted communication with the client device, when the connection request encrypted with either one of the first port and the second port specified as a forwarding destination port is received, decrypts the connection request, and transfers the decrypted connection request to the monitoring part via the forwarding destination port, wherein
   in a case that the connection request is received from the client device via the first port, the monitoring part does not forward the connection request to the processing part, and
   in a case that the connection request is received via the second port, the monitoring part forwards the connection request to the processing part, and
   when the connection request is transferred, the processing part performs the predetermined process by an encrypted communication with the client device via the second port and the encrypted communication part, and
   wherein the encrypted communication part determines the forwarding destination port specified in the connection request from the client device, and when the first port is specified as the forwarding destination port, changes the forwarding destination port to the second port and transfers the connection request to the monitoring part via the second port.

2. The embedded apparatus according to claim 1, wherein the monitoring part denies the connection request when the connection request to the processing part is received directly from the client device via the first port.

3. The embedded apparatus according to claim 2, wherein the monitoring part transmits a reply of a connection error to the client device that transmitted the connection request directly via the first port.

4. The embedded apparatus according to claim 1, wherein the monitoring part denies the connection request when the first port that is specified as the forwarding destination port.

5. The embedded apparatus according to claim 1, wherein the monitoring part accepts the connection request when the connection request to the processing part by a security architecture Internet protocol is received from the client device via the first poet.

6. The embedded apparatus according to claim 1, wherein the processing part performs either one of a setting process and a reference process of a predetermined setting parameter of the embedded apparatus by a remote communication based on a telnet protocol.

7. The embedded apparatus according to claim 1, wherein the processing part performs a file transfer process based on a file transfer protocol.

8. The embedded apparatus according to claim 1, wherein the encrypted communication part is a secure shell program that transfers the connection request to the monitoring part via the forwarding destination port.

9. A remote-processing method for an embedded apparatus that is configured to be connected to a client device via a network, the embedded apparatus including a processing unit, a monitoring unit, and an encrypted communication unit, the remote-processing method comprising:
   performing, by the processing unit, a predetermined process by a remote operation from the client device;
   monitoring, by the monitoring unit, a connection request from the client device for connection to the processing unit, the connection request being forwarded via a first port that is a connection interface for an unencrypted communication with the processing unit or via a second port that is a connection interface for an encrypted communication with the processing unit;
   determining whether the connection request is received from the client device via the first port, or is received from the client device via the second port, and in a case that the connection request is received from the client device via the first port, not forwarding to the processing part the connection request received via the first port, and in a case that the connection request is received via the second port, forwarding to the processing part the connection request received via the second port; and
   communicating by performing an encrypted communication with device, when the connection request encrypted with either one of the first port and the second port specified as a forwarding destination port is received, decrypting the connection request, and transferring the decrypted connection request to the monitoring unit via the forwarding destination port,
   wherein when the connection request is transferred, the processing includes the processing unit performing the predetermined process by an encrypted communication with the client device via the second port and the encrypted communication unit, and
   determining whether the first port that is specified as the forwarding destination port in the connection request from the client device, and when the first port is specified as the forwarding destination port, changing the forwarding destination port to the second port and transferring the connection request to the monitoring unit via the second port.

10. A computer program product comprising a non-transitory computer-usable medium having computer-readable program codes embodied in the medium for implementing a remote-processing method for an embedded apparatus that is configured to be connected to a client device via a network, the embedded apparatus including a processing unit, a monitoring unit, and an encrypted communication unit, a codes when executed causing a computer to execute:
   performing, by the processing unit, a predetermined process by a remote operation from the client device;

monitoring, by the monitoring unit, a connection request from the client device for connection to the processing unit, the connection request being forwarded via a first port that is a connection interface for an unencrypted communication with the processing unit or via a second port that is a connection interface for an encrypted communication with the processing unit;

determining whether the connection request is received from the client device via the first port, or is received from the client device via the second port, and in a case that the connection request is received from the client vice via the first port, not forwarding to the processing part the connection request received via the first port, and in a case that the connection request is received via the second port, forwarding to the processing part the connection request received via the second port; and communicating by performing an encrypted communication with the client device, when the connection request encrypted with either one of the first port and the second port specified as a forwarding destination port is received, decrypting the connection request, and transferring the decrypted connection request to the monitoring unit via the forwarding destination port, wherein when the connection request is transferred, the processing includes the processing unit performing the predetermined process by an encrypted communication with the client device via the second port and the encrypted communication unit, and determining whether the first port that is specified as the forwarding destination port in the connection request from the client device, and when the first port is specified as the forwarding destination port, changing the forwarding destination port to the second port and transferring the connection request to the monitoring unit via the second port.

* * * * *